(12) United States Patent
McConnell et al.

(10) Patent No.: US 6,988,161 B2
(45) Date of Patent: Jan. 17, 2006

(54) MULTIPLE PORT ALLOCATION AND CONFIGURATIONS FOR DIFFERENT PORT OPERATION MODES ON A HOST

(75) Inventors: James A. McConnell, Longmont, CO (US); Ronald L. Dammann, Palo Alto, CA (US); Robert Chan, San Jose, CA (US); Narayanan Kaniyur, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 10/022,330

(22) Filed: Dec. 20, 2001

(65) Prior Publication Data

US 2003/0120852 A1 Jun. 26, 2003

(51) Int. Cl.
*G06F 13/00* (2006.01)

(52) U.S. Cl. .......................................... 710/316; 714/758
(58) Field of Classification Search ................... 710/52, 710/56, 107, 316, 317, 8, 10, 11, 305; 709/223, 709/225; 711/147, 149; 714/758
See application file for complete search history.

(56) References Cited

U.S. PATENT DOCUMENTS

| | | | | |
|---|---|---|---|---|
| 6,061,756 A | * | 5/2000 | Dutton et al. ................. | 710/311 |
| 6,108,725 A | * | 8/2000 | Chatter ......................... | 710/56 |
| 6,141,765 A | * | 10/2000 | Sherman ....................... | 713/400 |
| 6,167,491 A | * | 12/2000 | McAlpine ..................... | 711/149 |
| 6,381,247 B1 | * | 4/2002 | Munter et al. ................ | 370/419 |
| 6,732,318 B2 | * | 5/2004 | Collier et al. ................. | 714/758 |
| 6,735,660 B1 | * | 5/2004 | Osten et al. .................. | 710/305 |
| 2003/0018761 A1 | * | 1/2003 | Doyle et al. .................. | 709/223 |

FOREIGN PATENT DOCUMENTS

WO       09/606025       6/2000

OTHER PUBLICATIONS

Eddington, "InfiniBridge–TM: An integrated InifiniBand switch and channel adapter", Mellanox technologies, Hot Chips 13 Symposium, Aug. 19, 2001, 22 pp. (http://www.hotchips.org/archive/hc13/indexhc13.html).*

* cited by examiner

*Primary Examiner*—Mark H. Rinehart
*Assistant Examiner*—Clifford Knoll
(74) *Attorney, Agent, or Firm*—Rob D. Anderson

(57) ABSTRACT

A port configuration mechanism is provided at a host for multiple port allocation and shared resource utilization to support multiple port configurations for different port operation modes on a host to handle data transfers in a switched fabric data network for scalable solutions.

24 Claims, 10 Drawing Sheets

| FIG. 13A | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| FIG. 13B | 0 | 1 | 2 | 3 | 0 | 1 | 2 | 3 | 0 | 1 | 2 | 3 | 0 | 1 | 2 |
| FIG. 13C | D7 | D0 | D5 | D3 | D8 | D1 | D6 | D4 | D9 | D2 | D7 | D5 |  | D3 | D8 |
| FIG. 13D | D | S | D | D | D | D | D | E | D | D | D | I | D | D | D |

MULTIPLE PORT ALLOCATION AND CONFIGURATIONS FOR DIFFERENT PORT OPERATION MODES ON A HOST

TECHNICAL FIELD

The present invention relates to data transfer interface technology in a data network, and more particularly, relates to multiple port allocation and shared resource utilization to support multiple port configurations for different port operation modes on a host to handle data transfers in a cluster.

BACKGROUND

As high-speed and high-performance communications become necessary for many applications such as data warehousing, decision support, mail and messaging, and transaction processing applications, a clustering technology has been adopted to provide availability and scalability for these applications. A cluster is a group of one or more host systems (e.g., computers, servers and workstations), input/output (I/O) units which contain one or more I/O controllers (e.g. SCSI adapters, network adapters etc.) and switches that are linked together by an interconnection fabric to operate as a single data network to deliver high performance, low latency, and high reliability. Clustering offers three primary benefits: scalability, availability, and manageability. Scalability is obtained by allowing servers and/or workstations to work together and to allow additional services to be added for increased processing as needed. The cluster combines the processing power of all servers within the cluster to run a single logical application (such as a database server). Availability is obtained by allowing servers to "back each other up" in the case of failure. Likewise, manageability is obtained by allowing the cluster to be utilized as a single, unified computer resource, that is, the user sees the entire cluster (rather than any individual server) as the provider of services and applications.

Emerging network technologies for linking servers, workstations and network-connected storage devices within a cluster include InfiniBand™ and its predecessor, Next Generation I/O (NGIO) which have been recently developed by Intel Corp. and other companies to provide a standard-based I/O platform that uses a channel oriented, switched fabric and separate I/O channels to meet the growing needs of I/O reliability, scalability and performance on commercial high-volume servers, as set forth in the "*Next Generation Input/Output (NGIO) Specification,*" NGIO Forum on Jul. 20, 1999 and the "*InfiniBand™ Architecture Specification,*" Revision 1, the InfiniBand™ Trade Association on Jun. 19, 2001.

One major challenge to implementing clusters based on emerging NGIO/InfiniBand technology is to ensure that data messages traverse reliably between given ports of a source node (data transmitter) and a destination node (data receiver), via one or more switches and given transmission links of a switched fabric data network. Each host node may serve as a source (initiator) node which initiates a message data transfer or a destination node of a message passing operation. Each host node may also contain one or more channel adapters (CAs) each including multiple ports for redundancy and multiple data networks. Likewise, each switch may also include one or more ports for relaying data between the links to end nodes within the switched fabric data network.

According to the InfiniBand™ Architecture Specification as set forth on Jun. 19, 2001, each port in a switch or a channel adapter (CA) installed in the host node may be configured to support a single port operation mode of a different link width and speed. However, there is no mechanism as defined in the existing InfiniBand™ Architecture Specification to enable a single port to support multiple port width configurations for a greater freedom of connectivity and product differentiation. In addition, there is no existing port logic implemented or shared resource utilized to support port InfiniBand™ ports configured for multiple port operation modes.

Therefore, there is a need for multiple port allocation and shared resource utilization to support multiple port configurations for different port operation modes on a host to handle data transfers in a switched fabric data network.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIGS. 11A–11D are example timing diagrams of example transmitter/receiver (TX/RX) buses used by a single 4X port in an example IBA subnet according to an embodiment of the present invention;

FIGS. 12A–12D are example timing diagrams of example transmitter/receiver (TX/RX) buses used by a single 1X port in an example IBA subnet according to an embodiment of the present invention;

FIGS. 13A–13D are example timing diagrams of example transmitter/receiver (TX/RX) buses used by four (4) independent 1X port s in an example IBA subnet according to an embodiment of the present invention.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and Server Net and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
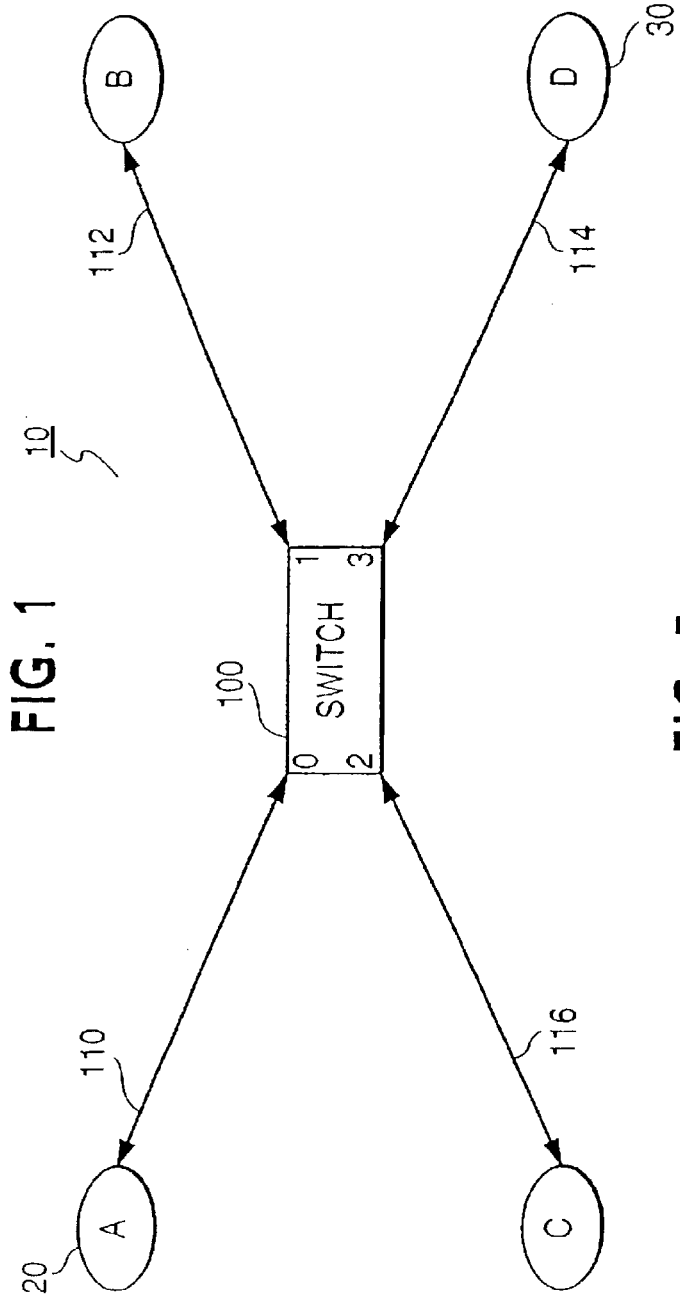
FIG. 1 illustrates a simple data network having several interconnected nodes for data communications according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 116, and 114. Each physical link may support a number of logical point-to-point channels. Each channel may be a bi-directional data path for allowing commands and data messages to flow between two connected nodes (e.g., host systems, switch/switch elements, and I/O units) within the data network.

Each channel may refer to a single point-to-point connection where data may be transferred between end nodes (e.g., host systems and I/O units). The centralized switch 100 may also contain routing information using, for example, explicit routing and/or destination address routing for routing data from a source node (data transmitter) to a destination node (data receiver) via one or more physical links, and re-routing information for redundancy.

The specific number and configuration of end nodes (e.g., host systems and I/O units), switches and links shown in FIG. 1 is provided simply as an example data network. A wide variety of implementations and arrangements of a number of end nodes (e.g., host systems and I/O units), switches and links in all types of data networks may be possible.

According to an example embodiment or implementation, the end nodes (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association as revised on Jun. 19, 2001. According to the NGIO/InfiniBand™ Specification, the switch 100 may be an NGIO/InfiniBand™ switched fabric (e.g., collection of links, routers, switches and/or switch elements connecting a number of host systems and I/O units), and the end node may be a host system including one or more host channel adapters (HCAs), or a remote system such as an I/O unit including one or more target channel adapters (TCAs).

Figure 2:
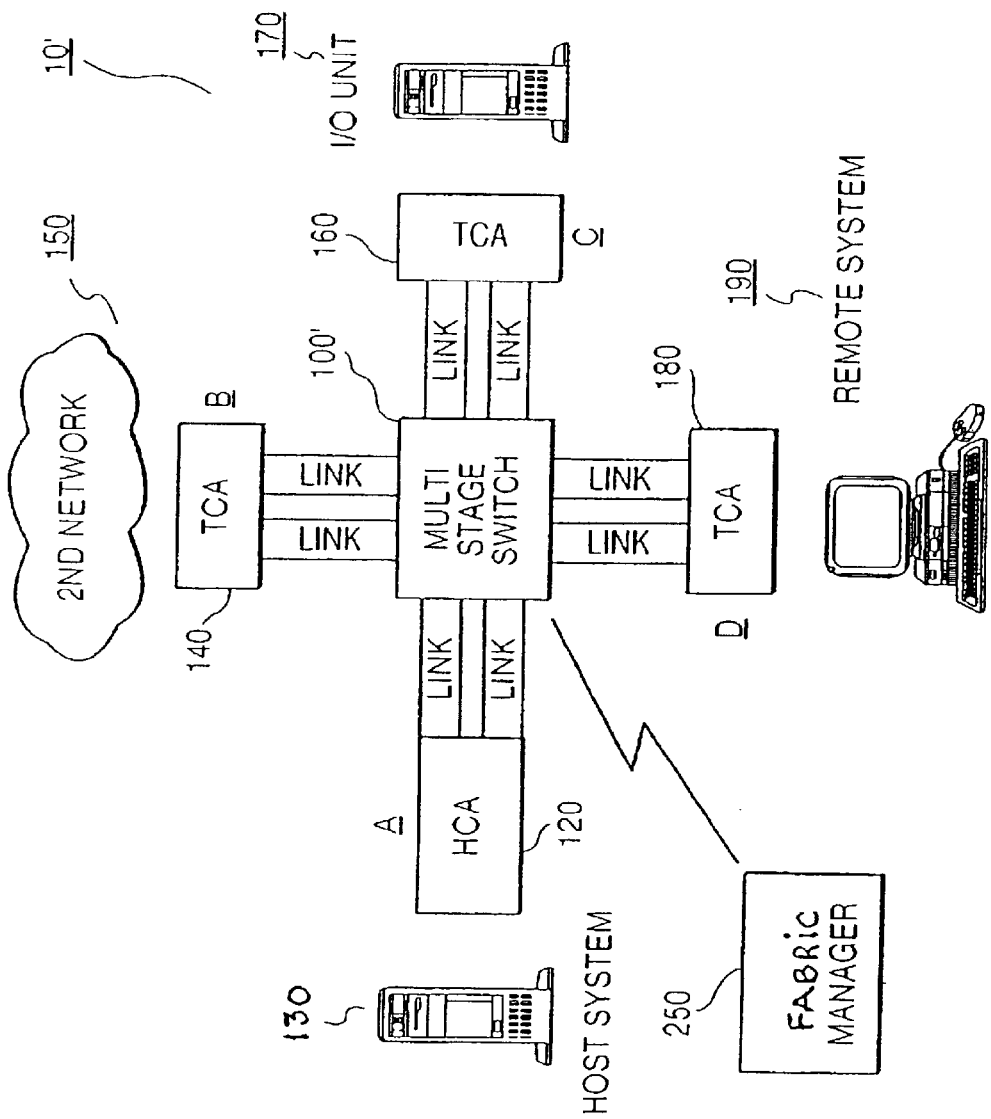
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ Architecture to transfer message data from a source node to a destination node according to an embodiment of the present invention. As shown in FIG. 2, the data network 10' includes an NGIO/InfiniBand™ switched fabric 100' for allowing a source node and a destination node to communicate to a large number of other intermediate nodes over one or more designated channels. Each node may contain work queue formed in pairs, known as Queue Pair (QP), in which service (work) requests are posted by a consumer (independent process or thread of an operating system "OS") to describe data transfer operations (i.e., send/receive operations and remote direct memory access "RDMA" read/write operations) and location of data to be moved for processing and/or transportation over one or more designated channels via a switched fabric 100'. Each end node may also serve as a source (initiator) node which initiates a message data transfer (message send operation) or a destination node of a message passing operation (message receive operation). Examples of such an end node include host servers providing a variety of applications or services and I/O units providing storage oriented and network oriented IO services.

Work requests (data movement operations such as message send/receive operations and RDMA read/write operations) may be posted to queue pairs (QPs) such that one or more channels between communication devices at an end node or between multiple end nodes connected together directly or via a data network may be created and managed to perform requested operations. A channel connection may be established over a switched fabric 100' to allow work queue pairs (QPs) at source and destination nodes (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end nodes or end stations, switches and links may be used for relaying data in groups of packets between the end stations and switches via corresponding NGIO/InfiniBand™ links. A physical link can be a copper cable, an optical cable, or printed circuit wiring on a backplane used to interconnect switches, routers, repeaters and channel adapters (CAs) forming the NGIO/InfiniBand™ switched fabric 100'.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be simply considered as channel adapters (CAs) provided to interface end nodes to the NGIO/InfiniBand™ switched fabric, and may be implemented in compliance with "*Next Generation I/O Link Architecture Specification: HCA Specification, Revision 1.0*", and the "*InfiniBand™ Specification*" and the "*InfiniBand™ Link Specification*" for enabling the end nodes (endpoints) to communicate to each other over an NGIO/InfiniBand™ channel(s) with data transfer rates, for example, from 2.5 gigabit per second (Gbps), 10 Gbps and 30 Gbps. In addition, individual channel adapters (CAs) and switches may have one or more connection points known as "ports" for establishing one or more connection links between end nodes (e.g., host systems and I/O units). In addition, one or more channel adapters (CA) may be advantageously installed, for example, at a host system 130 to expand the number of ports available for redundancy and multiple switched fabrics.

The multi-stage switched fabric 100' may include one or more subnets interconnected by routers in which each subnet is composed of switches, routers and end nodes (such as host systems or I/O subsystems). In addition, the multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions.

If the multi-stage switched fabric 100' represents a single subnet of switches, routers and end nodes (such as host systems or I/O subsystems) as shown in FIG. 2, then the fabric manager 250 may alternatively be known as a subnet manager "SM". The fabric manager 250 may reside on a port of a switch, a router, or a channel adapter (CA) of an end node and can be implemented either in hardware or software. When there are multiple subnet managers "SMs" on a subnet, one subnet manager "SM" may serve as a master SM. The remaining subnet managers "SMs" may serve as standby SMs. The master SM may be responsible for (1) learning or discovering fabric (network) topology; (2) assigning unique addresses known as Local Identifiers (LID) to all ports that are connected to the subnet; (3) establishing all possible data paths among end nodes, via switch forwarding tables (forwarding database); and (4) detecting and managing faults or link failures in the network and performing other network management functions. However, NGIO/InfiniBand™ is merely one example embodiment or implementation of the present invention, and the invention is not limited thereto. Rather, the present invention may be applicable to a wide variety of any number of data networks, hosts and I/O units using industry specifications. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
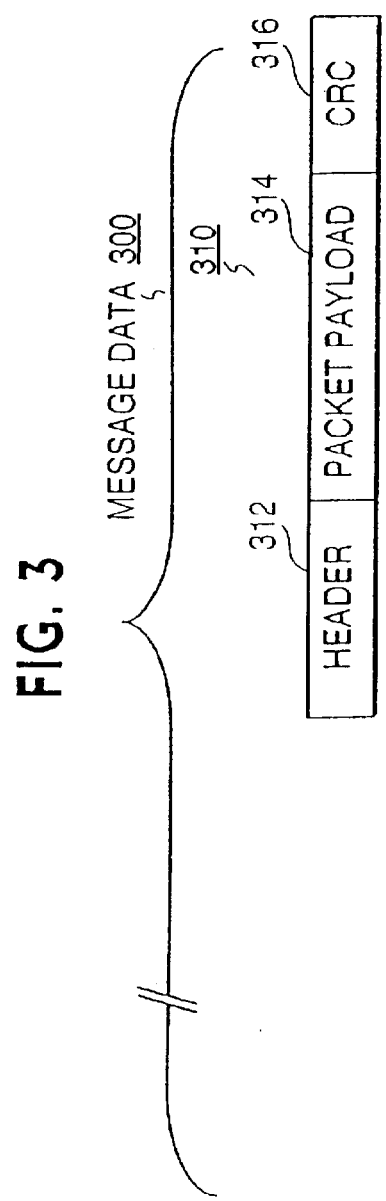
FIG. 3 illustrates an example packet of data messages transmitted from a source node (data transmitter) to a destination node (data receiver) in an example data network according to an embodiment of the present invention.

FIG. 3 illustrates an example packet format of message data transmitted from a source node (data transmitter) to a destination node (data receiver) through switches and/or intermediate nodes in an example subnet according to the "*InfiniBand™ Architecture Specification*" Revision 1 as set forth by the InfiniBand™ Trade Association on Jun. 19, 2001. As shown in FIG. 3, a message data 300 may represent a sequence of one or more data packets 310 (typically derived from data transfer size defined by a work request). Each packet 310 may include header information 312, variable format packet payload 314 and cyclic redundancy check (CRC) information 316. Under the "*Next Generation Input/Output (NGIO) Specification*" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ Architecture specification may include different types of headers such as, for example, a local routing header, a global routing header, a base transport header and extended transport headers including a data extended transport header, a RDMA extended transport header, and an Atomic extended transport header each of which contains functions as specified pursuant to the "*InfiniBand™ Architecture Specification*".

The packet payload 314 may contain user application data being transferred from a source node to a destination node through all switches and routers on the switched fabric 100' as shown, for example, in FIG. 2.

The cyclic redundancy check (CRC) information 316 may be variant or invariant. Invariant CRC (ICRC) covers the fields that do not change in a data message from a source node to a destination node through all switches and routers on the switched fabric 100' as shown in FIG. 2. Variant CRC (VCRC) covers the fields that can change from link to link as a data message is processed by switches and routers. Variant CRC (VCRC) may have to regenerated at each link through the switched fabric 100' as shown in FIG. 2.

Signaling protocols for NGIO/InfiniBand™ links may be utilized to implement packet delimiters, ordered-set delimiters, packing padding, and clock tolerance compensation between source and destination. Specifically, control symbols and ordered-sets of control and data symbols according to the InfiniBand™ specification may be utilized for signaling the beginning and end of a data packet 310 and for the gap between data packets 310, and code groups for controlling the flow of data packets 310 across the link, including packet padding and clock tolerance compensation. For example, Start of Data Packet Delimiter (SDP) symbols may be used to identify the start of a data packet 310. Start of Link Packet Delimiter (SLP) symbols may be used to identify the start of a link packet (not shown) which is used to contain necessary information to advertise current capacity to store data packets 310 and recover lost credits due to errors occurring during data packet transmission. End of Good Packet Delimiter (EGP) symbols may be used to mark the end of each data packet as it is transmitted by the originating port. End of Bad Packet Delimiter (EBD) symbols may be used to mark the end of a bad data packet forwarded by a switch or a router node. Other inter-packet flow control sequences such as comma character and associated flow control character, and IDLE characters may be taken into account to determine the maximum defined period between IDLE characters.

In addition, link packets may also be utilized to train and maintain link operation between a source node (data transmitter) and a destination node (data receiver), via any switches and/or intermediate nodes in the switched fabric 100' as shown in FIG. 2.

Figure 4:
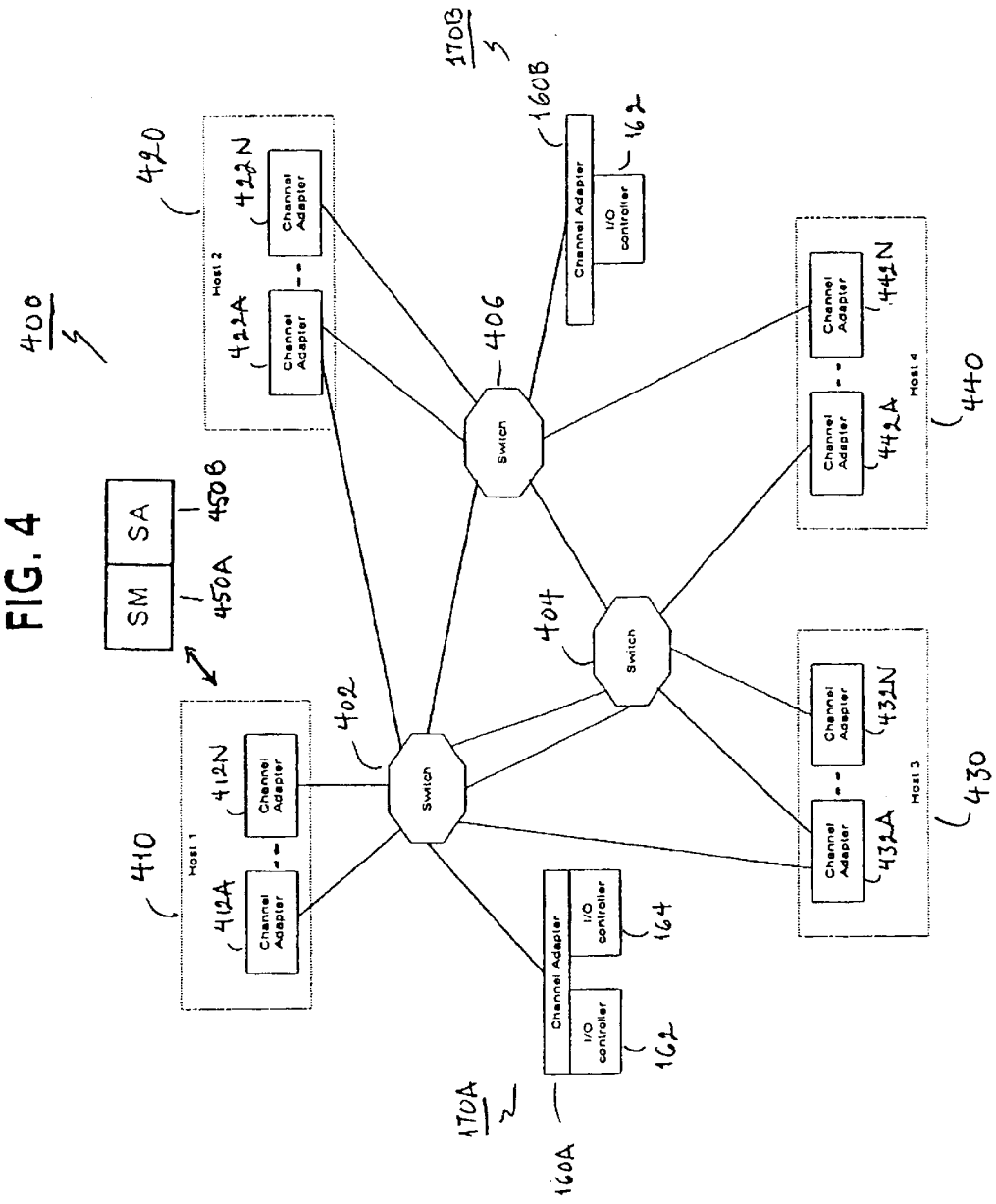
FIG. 4 illustrates an example InfiniBand™ Architecture (IBA) subnet including switches, routers and channel adapters installed at respective end nodes according to an embodiment of the present invention.

FIG. 4 illustrates an example InfiniBand™ Architecture (IBA) subnet in an InfiniBand™ cluster including, for example, four (4) host systems including a plurality of channel adapters (CAs) 410, 420, 430 and 440, three (3) switches 402, 404 and 406, and two I/O enclosures 170A–170B with channel adapters (CAs) 160A–160B according to an embodiment of the present invention. Each of the host systems 410, 420, 430 and 440 and the I/O enclosures 170A–170B may serve as an individual service provider or an individual InfiniBand™ client requesting services from the service provider in a client/server model, for example. One or more channel adapters (CAs) may be installed at each host system 410, 420, 430 and 440.

The IBA subnet 400 may also include a collection of switch (S1) 402, switch (S2) 404, and switch (S3) 406 arranged to establish connection between the host systems 410, 420, 430 and 440, via respective channel adapters (CAs) 412A–412N, 422A–422N, 432A–432N and 442–442N and I/O enclosures 160A–160B, via respective channel adapters (CAs) 160A–160B. Each switch as well as the channel adapter (CA) may have one or more connection points called "ports" provided to establish connection with every other switch and channel adapter (CA) in an example IBA subnet 400 via one or more physical links.

Typically IBA management services may be provided by a local subnet manager "SM" 450A and a local subnet administrator "SA" 450B. The subnet manager "SM" 450A and the subnet administrator "SA" 450B may substitute the fabric manager 250 shown in FIG. 2, and can be implemented either in hardware or software module (i.e., an application program) installed to provide IBA management services for all switches and end nodes in the IBA subnet 400. For example, if the subnet manager "SM" 450A is implemented in software, a subnet management software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human subnet (fabric) administrator to conveniently plug-in or download into an existing operating system (OS). Alternatively, the software module may also be bundled with the existing operating system (OS) which may be activated by a particular device driver for performing all network management functions in compliance with the InfiniBand™ Architecture specification.

In one embodiment of the present invention, both the subnet manager "SM" 450A and the subnet administrator "SA" 450B may be installed at any one of the host systems 410, 420, 430 and 440 for managing all subnet management functions. However, the subnet manager "SM" 450A and the subnet administrator "SA" 450B may also be installed as part of any individual end node and switch within the IBA subnet 400.

The management services may be broadly classified into subnet services and general services. At a minimum the subnet services, offered by the subnet manager "SM" 450A, include discovering fabric topology, assigning unique addresses called Local Identifiers (LID) to all ports that are connected to the IBA subnet 400, programming switch forwarding tables (also known as routing table) and maintaining general functioning of the IBA subnet 400. Most of the data collected during discovery and used to configure the IBA subnet 400 may be assimilated by the subnet administrator "SA" 450B for providing access to information such as data paths and alternate data paths between end nodes, topology change notifications and notification of events, including error detection, and recovery procedures.

Each of these management services may be implemented as logically independent entities, referred to as Managers and Agents, and Interfaces. Managers may be conceptual functional entities that effect control over IBA fabric-attached devices on the IBA subnet 400 or provide for gathering information from IBA fabric-attached devices on the IBA subnet 400. In general, Managers may reside anywhere in the IBA subnet 400 (or switched fabric 100' as shown in FIG. 2). Similarly, Agents may be conceptual functional entities present in channel adapters (CAs), switches, and routers that process management messages arriving at the port of the channel adapters (CAs), switches, and routers where they exist. Both Managers and Agents may reside on different ports on different channel adapters (CAs) installed at end nodes in an IBA subnet 400 as shown in FIG. 4 or be located on the same port and same channel adapter (CA).

Communication between Managers and Agents, and in some cases, between Agents, may be performed through management messages referred to as Management Datagrams (MADs). Management Datagrams (MADs) are the basic elements of the message scheme defined for management communications. MADs may be classified into predefined management classes and for each MAD there may be a specified format, use, and behavior according to the InfiniBand™ Architecture specification.

Figure 5:
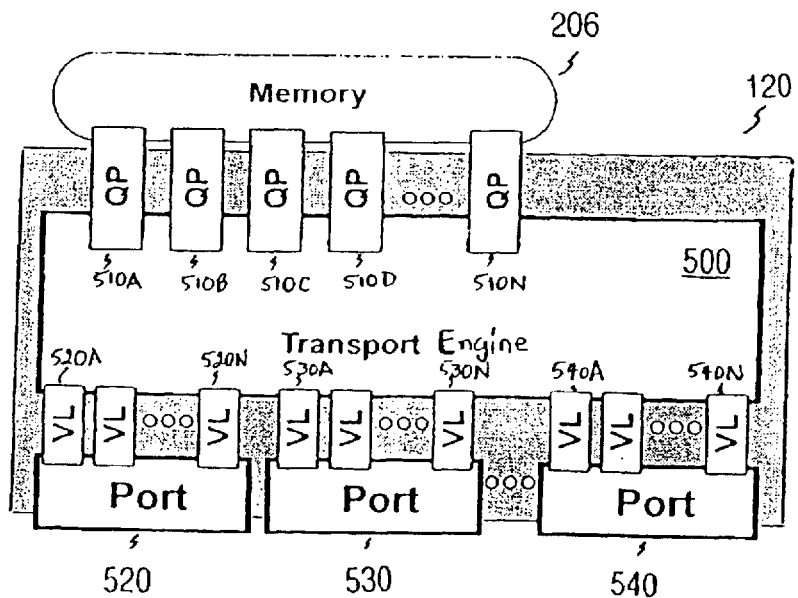
FIG. 5 illustrates a sample queue pair (QP) at an end node in an example IBA subnet according to an embodiment of the present invention.

FIG. 5 illustrates an example channel adapter (CA) 120 installed in a host system 130 to support data transfers via a NGIO/InfiniBand™ switched fabric 100' as shown in FIG. 2. The channel adapter (CA) 120 has a programmable transport engine 500 supporting a number of queue pairs (QPs) 510A–510N in which work requests may be posted to describe data movement operation and location of data to be moved for processing and/or transportation via a switched fabric 100'. All queue pairs (QPs) may share physical ports 520–540 into a switched fabric 100'. Each queue pair (QP) includes a send queue ("SQ" for outbound requests) served as an "initiator" which requests, for example, normal message sends to remote QPs, remote direct memory access "RDMA" reads which request messages to be read from specific memory locations of a target system 190 as shown in FIG. 2 for example, via a switched fabric 100', and remote direct memory access "RDMA" writes which request messages to be written onto specific memory locations of a target system 190, via a switched fabric 100'; and a receive queue ("RQ" for inbound requests) served as a "responder" which receives requests for messages from normal sends, RDMA reads and RDMA writes from a target system 190, via a switched fabric 100'.

The channel adapter (CA) 120, as well as an individual switch, may also have multiple ports 520–540 to access the NGIO/InfiniBand™ switched fabric 100'. Each port may be assigned a local ID (LID) or a range of LIDs. Each port has its own set of transmit and receive buffers (FIFOs) such that each port is capable of sending and receiving data messages concurrently. Buffering may be channeled through respective virtual lanes (VL) 520A–520N, 530A–530N and 540A–540N where each VL has its own flow control.

Each host system 130 as shown, for example, in FIG. 2, may serve as a source (initiator) node which initiates a message data transfer (message send operation) or a destination node of a message passing operation (message receive operation). Examples of such a host system 130 include host servers providing a variety of applications or services and I/O units providing storage oriented and network oriented IO services. Requests for work (data movement operations such as message send/receive operations and RDMA read/write operations) may be posted to queue pairs (QPs) 510A–510N associated with a given channel adapter (CA), one or more channels may be created and effectively managed so that requested operations can be performed. In addition, one or more channel adapters (CAs) 120 may be advantageously installed at a host system 130 to expand the number of ports available for redundancy and multiple switched fabrics.

Figure 6:
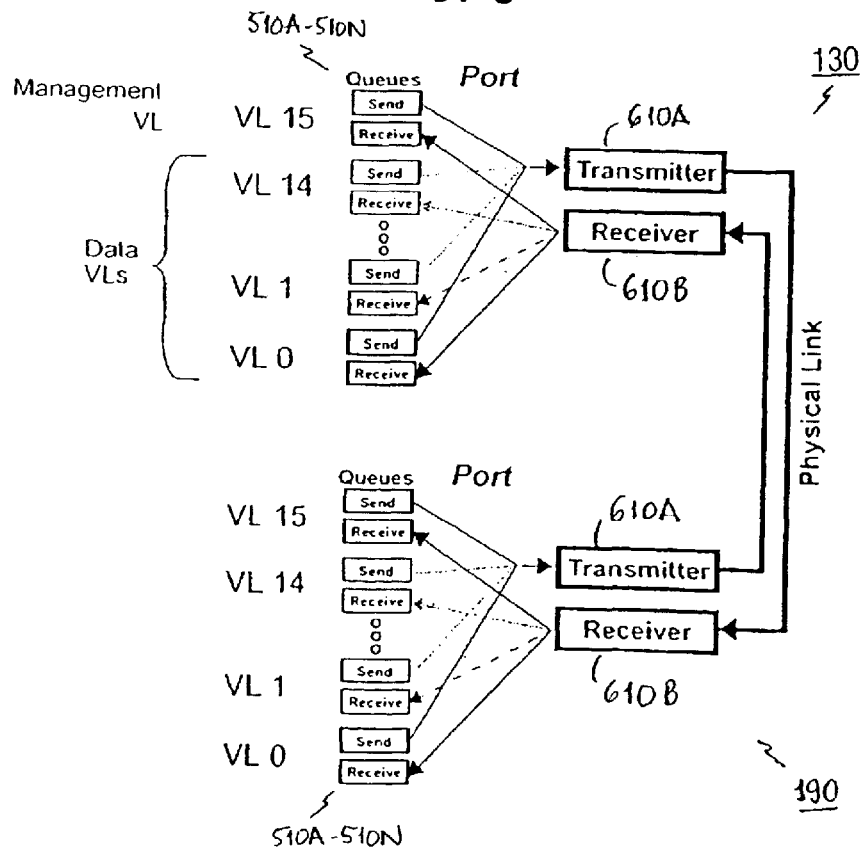
FIG. 6 illustrates an example virtue lane (VL) mechanism for creating multiple virtual links within a single physical link between a source node (data transmitter) and a destination node (data receiver) in an example data network according to an embodiment of the present invention.

FIG. 6 illustrates example Virtual Lanes (VL) from a single port to work queue pairs (QPs) 510A–510N at respective end node (host system 130 and target system 190 for example). As shown in FIG. 6, each end of the physical link has a transmitter 610A and a receiver 610B for transmitting and receiving data packets 310, via the NGIO/InfiniBand™ switched fabric 100'. The terms "transmitter" and "receiver" are utilized to describe each end of a given physical link. The transmitter 610A is the node sourcing data packets 310. The receiver 610B is the consumer of the data packets 310.

Virtual lanes (VLs) provides a mechanism for creating multiple virtual links within a single physical link at a given port of an end node (i.e., host system 130 and target system 190 as shown in FIG. 2) or switch. Each virtual lane (VL) represents a set of transmit and receive buffers (FIFOs) in a given port of an end node or a switch in the switched fabric 100'.

According to the InfiniBand™ Architecture specification, each Port may support, but not limited thereto, up to 16 virtual lanes, including VL0–VL14 known as data virtual lanes and VL15 known as a management virtual lane which is reserved exclusively for fabric (subnet) management. The actual data VLs that a Port uses may be configured by a fabric manager 250 as shown in FIG. 2, or a subnet manager 450A as shown in FIG. 4 if the data network using the InfiniBand™ Architecture is subdivided into IBA subnets interconnected by routers.

In addition, the physical links between respective ports of a host node (or a switch) may correspond to bi-directional serial links (2.5 Gb/s for example) used to connect respective ports of channel adapters (CAs) and switches. The physical links may also be configured to support a different link width and speed, via a unique Management Datagram (MAD), known as a PortInfo Attribute used to provide port-specific management information. The port-specific management information may be implemented for every Port on a host node to configure and control the operation of each Port. Likewise, the configuration information may vary by node type and by port within a host node. Subnet Management Packets (SMP) may be used to do Gets and Sets to read and write fields in the PortInfo Attribute. The following fields in the PortInfo Attribute control the operation of a standard Port according to the InfiniBand™ Architecture specification: LinkWidthSupported field used to report the number of lanes supported by the Port (1:1x Only, 3:1x or 4x); LinkWidthEnabled field used to control the number of lanes enabled for the Port (1:1x Only, 2:4x Only, 2:1 x or 4x); LinkWidthActive field used to report the number of active lanes for the Port; PortState field used to control the operation mode for the port. This has the following states (1: Down, 2: Initialize, 3: Armed, and 4: Active); and PortPhysicalState field used to control operation of low-level Port Physical Logic that configures the operation mode for the Port. This has the following states (1: Steep, 2: Polling, 3: Disabled, 4: Port Configuration Training, 5: Linkup, 6: Link Error Recovery).

In particular, the LinkWidthEnabled field is also used to describe the enabled link width for that specific port. The port shall only configure the link to width(s) based on the following example enumerated values:

0: No State Change (NOP).
1: 1x which indicates a port supporting 1x mode operation only.
2: 4x which indicates a port supporting 4x mode operation only.
3: 1x or 4x which indicates a port supporting 1x or 4x mode operation.
8: 12x which indicates a port supporting 1x or 4x mode operation.
9: 1x or 12x which indicates a port supporting 1x or 4x mode operation.
10: 4x or 12x which indicates a port supporting 1x or 4x mode operation.
11: 1x or 4x or 12x which indicates a port supporting 1x or 4x mode operation. 4–7, 12–254: Reserved (Ignored).

For example, if a LinkWidthEnabled field included in the PortInfo Attribute is to support one port and that port is 1x capable, the PortInfo Attribute may report that the port is 1x capable using a single serial link (typically 0.25 GB/s in each direction, for example). However, if a LinkWidthEnabled field included in the PortInfo Attribute is to support one Port and that Port is 4x capable, the PortInfo Attribute may report that the Port is 1x or 4x capable. In order to support a 4x mode operation, four (4) distinct serial links are required to create a 4x Port (typically 1.0 GB/s in each direction, for example). All 4x Ports can connect to 1x Ports in 1x mode but cannot use the full port bandwidth. Likewise, twelve (12) distinct serial links are required to create a 12x Port (typically 3.0 GB/s in each direction). All 12x ports can connect to 4x Ports in 4x mode and 1x Ports in 1x mode but cannot use the full port bandwidth.

Figure 7:
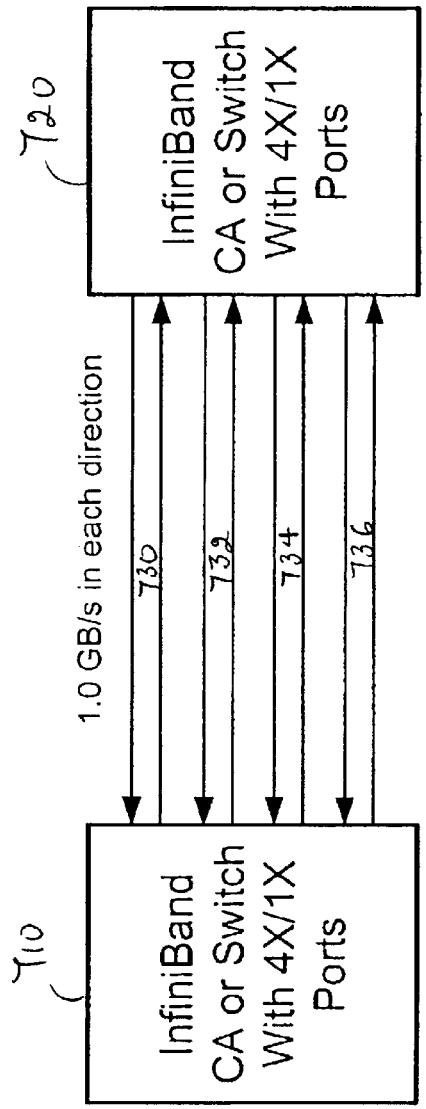
FIG. 7 illustrates two example nodes with 4X ports connected using 4X links in an example IBA subnet.

For example, FIG. 7 illustrates two example nodes with 4x Ports connected using 4x links in an example IBA subnet 400 shown in FIG. 4. As shown in FIG. 7, the first node 710 may correspond to an end node in the IBA subnet 400 including at least a channel adapter (CA) or a switch with 4x/1x Ports. The second node 720 may also correspond to an end node in the IBA subnet 400 including at least a channel adapter (CA) or a switch with 4x/1x Ports connected to the first node 710 using 4x links 730–736. Each physical link may support, for example, 1.0 GB/s in each direction between respective ports. A 4x link may be composed of four (4) physical lanes (Lane #0 through Lane #3) between respective ports.

Figure 8:
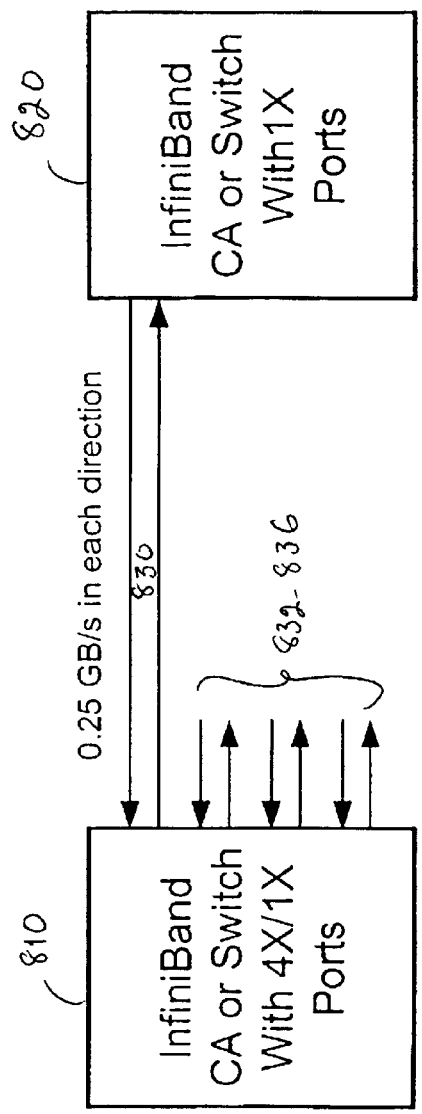
FIG. 8 illustrates an example node with a 4X port connected to another example node with a 1X port using a 1X link in an example IBA subnet.

FIG. 8 illustrates an example host node with a 4x Port connected to another host node with a 1x Port using a 1x link in an example IBA subnet 400 shown in FIG. 4. As shown in FIG. 8, the first node 810 may correspond to an end node in the IBA subnet 400 including at least a channel adapter (CA) or a switch with 4x/1x Ports. The second node 820 may also correspond to an end node in the IBA subnet 400 including at least a channel adapter (CA) or a switch with 1x ports connected to the first node 810 using 1x links 830. Each 1x link may be composed of a single lane between respective ports. The 4x Port operates with only a single serial link at, for example, 0.25 GB/s in each direction between respective Ports. However, the other three physical links in the 4x Port are not used and remain idle as there is no mechanism defined in the existing InfiniBand™ Architecture Specification to enable a single port such as a 4x Port to support multiple port width configurations for a greater freedom of connectivity and product differentiation. In addition, there is no existing port logic implemented or shared resource utilized to support InfiniBand™ ports configured for multiple port operation modes.

In order to address the physical links that are not supported by the InfiniBand™ Architecture specification and support multiple port width configurations for a greater freedom of connectivity and product differentiation, configuration mechanisms for multiple port allocation and shared resource utilization are advantageously installed in a host node (or switch to handle data transfers in an example IBA subnet 400 shown in FIG. 4, or a switched fabric 100' as shown in FIG. 4. An internal protocol may also be created to enable each of the 4x links to link up independently so that each 4x link may now take on the ability to be either a 1x link width or four (4) 1x link widths. As a result, a 4x link may serve as a single 4x link, a single 1x link or from one to four (1 to 4) independent 1x Ports. In other words, the Port may be configured as a 4x link in order to move substantial amounts of data, but may also be configured as four (4) independent 1x Ports in order to enable more connectivity.

Figure 9:
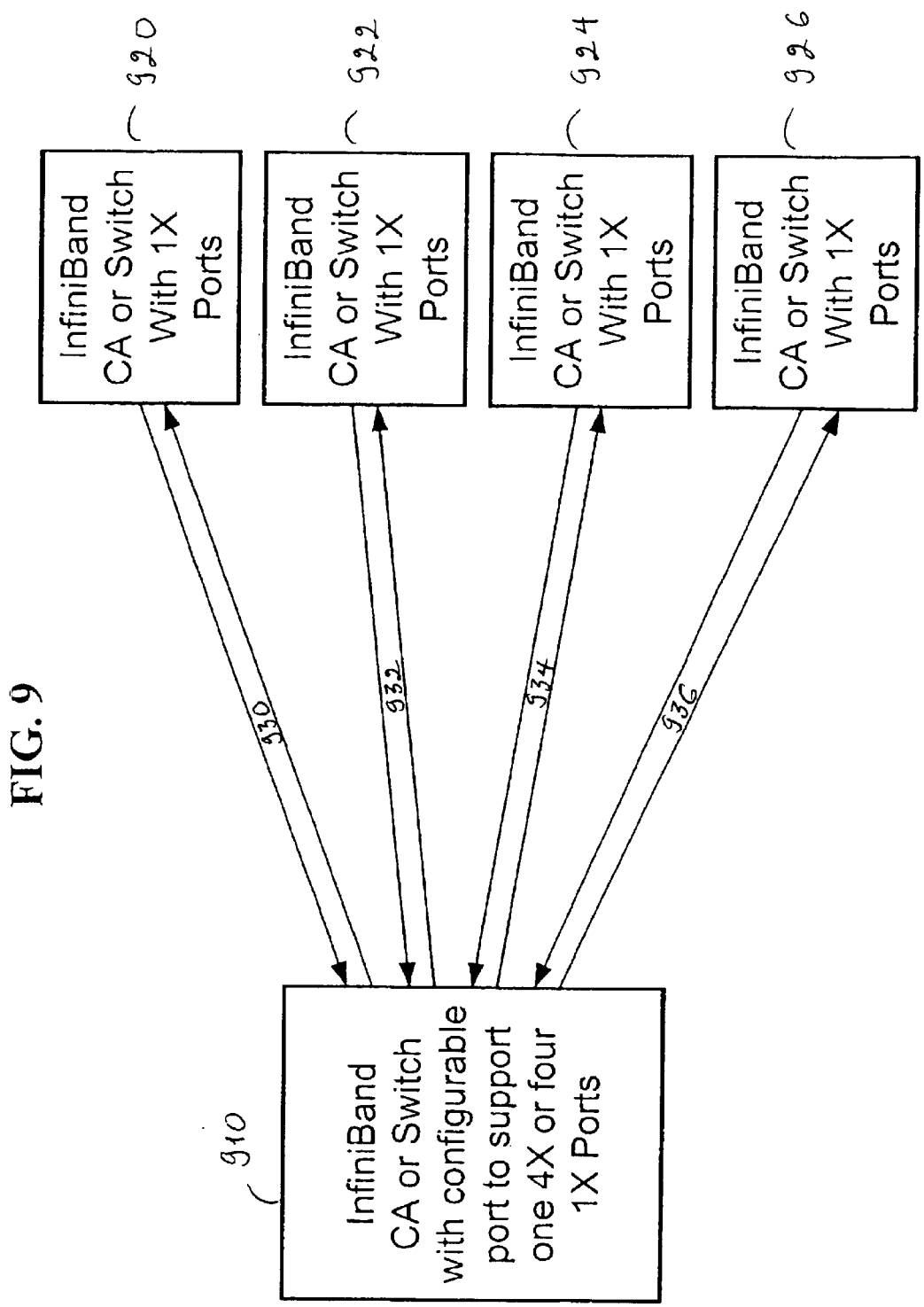
FIG. 9 illustrates an example 4x nodes connected with four (4) example nodes with 1x links in an example IBA subnet according to an embodiment of the present invention.

For example, FIG. 9 illustrates an example 4x nodes connected with four example nodes with 1x links in an example IBA subnet according to an embodiment of the present invention. As shown in FIG. 9, the first node 910 may correspond to an end node in the IBA subnet 400 including at least a channel adapter (CA) or a switch with a configurable Port to support a single 4x Port or four (4) independent 1x Ports. Each of four (4) independent remote nodes 920–926 may also correspond to an end node in the IBA subnet 400 including at least a channel adapter (CA) or a switch with 1x ports connected to the first node 910 using 1x links 930–936. The 4x port on the first node 910 can also be configured as a single 4x Port or as a single 1x Port as defined by the InfiniBand™ Architecture specification. Likewise, the 4x Port on the first node 910 may support 1.0 GB/s that is divided into four (4) independent 0.25 GB/s links for the 1x nodes 920–926. The 1x port of remote nodes 920–926 may support 0.25 GB/s data transfer on 1x links. Therefore, all four (4) physical links 930–936 are used.

The multiple port width configurations may be accomplished by (1) enabling (via an EPROM configuration bit) for each 4x Port to be trained and configured as four (4) independent 1x Ports; (2) allowing each link to train independently which translates to thirty-two (32) distinct Ports; and (3) creating a port-numbering scheme that accounts for this ability.

Under normal InfiniBand operation, an eight Port (4x capable) switch may report eight Port under the NumPorts field of the SwitchInfo Attribute. However, the present invention may report the actual number of physical links as the number of supported ports. In the above example, the value of NumPorts may be four (4). Assuming that the ports are numbered "0" to "3". If the 4x port is configured and trained as a 4x port, then the PortInfo Attribute for Port0 contains specific information regarding a 4x Port. Port #1, Port #2 and Port#3 are reported as "DOWN" in the PortInfo Attribute. If the 4x Port is configured as four independent 1x Ports, then each Port (0, 1, 2 and 3) return specific information (via the PortInfo Attribute) regarding a 1x Port.

Figure 10:
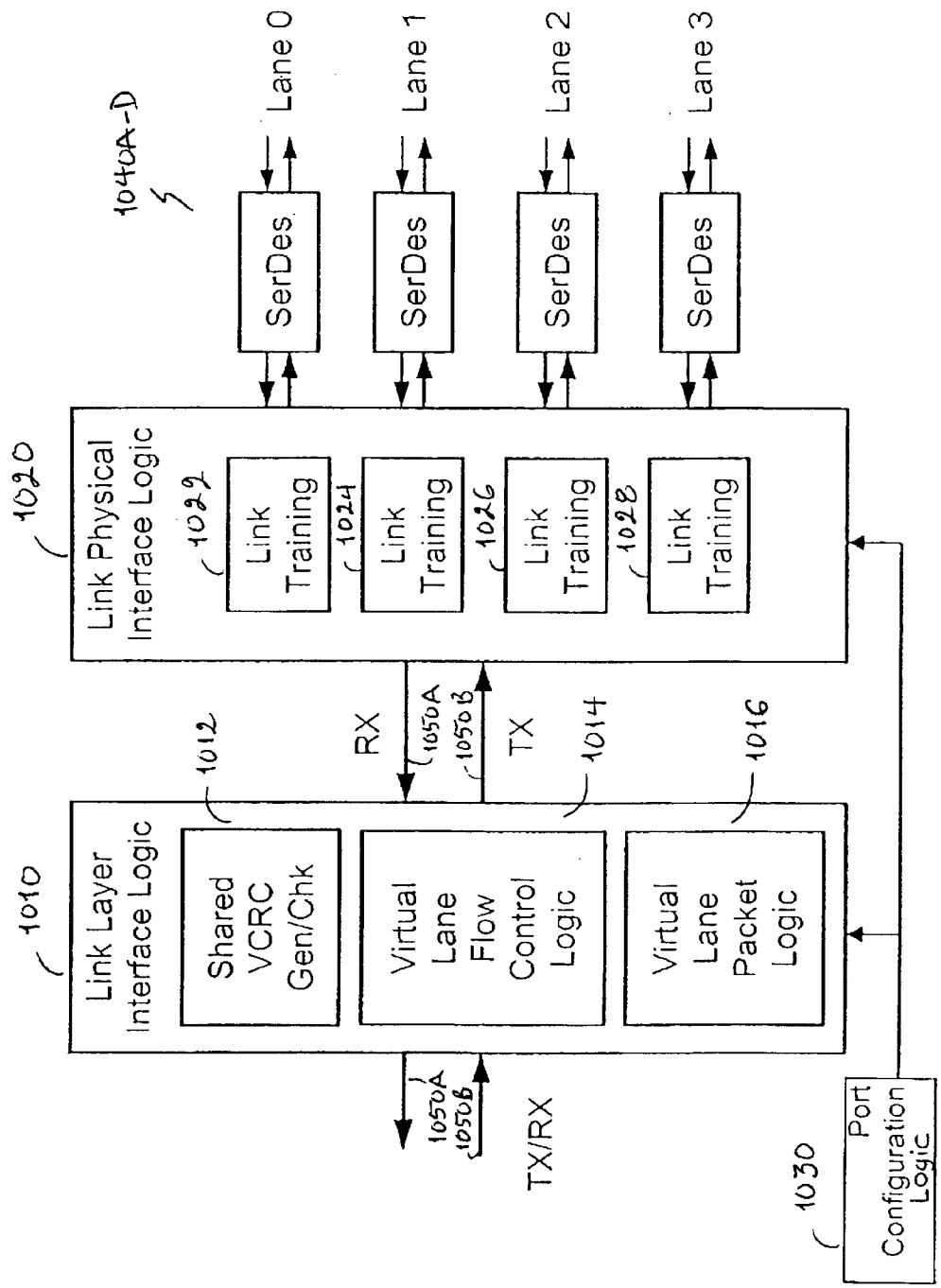
FIG. 10 illustrates an example configuration mechanism for multiple port allocation and configuration for channel adapters (CAs) and switches in an example IBA subnet according to an embodiment of the present invention.

Turning now to FIG. 10, an example configuration mechanism for multiple port allocation and configuration for channel adapters (CAs) and switches in an example IBA subnet according to an embodiment of the present invention is illustrated. As shown in FIG. 10, the configuration mechanism may comprise a Link Layer Interface Logic 1010 arranged to, a Link Physical Interface Logic 1020, a Port Configuration Logic 1030, and a plurality of SerDes (serialize/deserialize) blocks 1040A–1040D corresponding to the number of physical lanes (links) from Lane #0 to Lane #3.

The Link Layer Interface Logic 1010 may be arranged to handle the sending and receiving of data packets (see FIG. 3) and link packets across the physical links, and to provide link-related services such as resource addressing, buffering, flow control, error detection and switching. Such a Link Layer Interface Logic 1010 may include a Shared VCRC Generation/Checking Logic 1012 arranged to provide shared resource to support multiple port configurations, including implementation of Variant CRC and link packet CRC generation and checking for data packets and link packets; a Virtual lane Flow Control Logic 1014 arranged to control the sending and receiving of link packets; a Virtual Lane Packet Logic 1016 arranged to control the sending and receiving of data packets.

According to the InfiniBand™ Architecture specification, a single port may support one or more virtual lanes (VLs). For example, a 4x port or a 1x port may have 8 VLs (VL0 to VL7). As a result, the Virtual Lane Packet Logic 1016 may control how data packets are sent on VL0 to VL7. The Virtual Lane Flow Control Logic 1014 may control how link packets are sent and received to provide per VL flow control for VL0 to VL7. Also in the standard InfiniBand™ 4x or 1x port configuration, the Shared VCRC Generation/Checking Logic 1012, the Virtual lane Flow Control Logic 1014 and the Virtual Lane Packet Logic 1016 are configured to support VL0 to VL7 for Port N. The Shared VCRC Generation/Checking Logic 1012 then generates and checks the VCRC for each packet at a time.

When configured to support four (4) independent 1x Ports, the Shared VCRC Generation/Checking Logic 1012, the Virtual lane Flow Control Logic 1014 and the Virtual Lane Packet Logic 1016 may be reconfigured to support four (4) independent sets of VL0 and VL1 for Ports N, N+1, N+2, and N+3. The Shared VCRC Generation/Checking Logic 1012 may also generate and check the VCRC for four (4) independent data packets. This is done by time-multiplexing the CRC generation logic.

The Link Physical Interface Logic 1020 provides logical interfaces between a stream of packets and physical lanes and responsible for data encoding and decoding using the Industry Standard 8B/10B coding which is used by Fibre Channel, Gigabit Ethernet (IEEE 802.3z), and ServerNet. In addition to encode and decode, the Link Physical Interface Logic 1020 may include link training and initialization logic, clock tolerance compensation logic, and receive error detection logic. For example, the Link Physical Interface Logic 1020 provides the following InfiniBand™ Link Physical functions:

(1) 8B/10B data encoding and decoding and symbol error checking;

(2) Receive Elastic Buffer (not shown) to transfer data from a receive clock generated from the receive data to an internal central clock used by the most of the port logic. In the standard InfiniBand™ 4x and 1x Port configuration, there are four (4) receive clocks running at the same frequency with an arbitrary phase relationship between the clocks for each serial link. When configured to support four (4) independent 1x Ports, there are four (4) independent receive clocks running at different frequencies. The Elastic Buffer (not shown) may support both operating modes.

(3) Transmit Skip Sequences and delete received Skip Sequences.

(4) Send and receive Link Training Sequence One (TS1) and Link Training Sequence Two (TS2) to implement the InfiniBand™ Link Training Protocol. TS1 may be a sixteen symbol ordered-set composed of a comma (COM), a lane identifier data symbol, and fourteen data symbols to training sequence one. Likewise, TS2 may be a sixteen symbol ordered-set composed of a comma (COM), a lane identifier data symbol, and fourteen data symbols unique to training sequence two.

(5) Add and delete Start of Packet and End of Packet symbols to identify the beginning and end of link packets and data packets as described with reference to FIG. 3.

(6) Send Idle symbols when the links are idle.

According to InfiniBand™ Architecture specification, two Training Sequences (TS1 and TS2) are performed to automatically detect and initialize 1x and 4x links. When sending Training Sequences, each link sends a Lane Identifier (lane #0 to #3) as part of the training sequence. When receiving Training Sequences, each link decodes the Lane Identifier of the remote Port.

The LinkWidthEnabled field in the PortInfo Attribute controls the mode (4x or 1x) the port will use for link training. For example:

(1) When LinkWidthEnabled=1 (1x Only), the Training Sequences may be sent to Lane #0 with Lane ID #0. The Port may then be enabled to complete Link Training if Lane #0 receives valid Training Sequences with Lane ID #0.

(2) When LinkWidthEnabled=2 (4x Only), the Training Sequences may be sent to Lanes #0 to #3 with Lane IDs #0 to #3. The Port may then be enabled to complete Link Training if Lanes #0 to #3 receive valid Training Sequences with Lane IDs #0 to #3.

(3) When LinkWidthEnabled=3 (4x or 1x), the Training Sequences may be sent to Lanes #0 to #3 with Lane IDs #0 to #3. The Port may then be enabled to complete Link Training if Lanes #0 to #3 receive valid Training Sequences with Lane IDs #0 to #3. If the Port is unable to complete Link Training of 4x mode, the Link Training in 1x mode may be completed, if Lane #0 receives valid Training Sequences with Lane ID #0.

In order to support a single 4x or a single 1x Port or four (4) independent 1x Ports as shown in FIG. 9, the Link Physical Interface Logic may include four (4) independent Link Training Logic Blocks 1022–1028 arranged to support link training when configured as four (4) independent 1x Ports. However, the number of Link Training Logic Blocks 1022–1028 shown herein is not limited thereto.

When configured as one 4x or one 1x Port, only one Link Training Logic Block may be enabled and the remainder three Link Training Logic Blocks may be disabled. Link Training Sequences (TS1 and TS2) may be supported as described previously. For example, Lane #0 uses Lane ID #0 for link training in 1x mode. Likewise, Lanes #0 to #3 use Lane IDs #0 to #3 for link training in 4x Mode.

When configured as four (4) independent 1x Ports, all four (4) independent Link Training Logic Blocks 1022–1028 may be enabled. Each Link Training Logic Block 1022–1028 may be independent and may be used to control the operation of one Port and Lane.

Each Link Training Logic Block only supports LinkWidthEnabled=1 and sends Training Sequences with Lane ID #0 and allows the Port to complete Link Training if the Port receives valid Training Sequences with Lane ID #0. In addition, each 1x Port may operate independently and Link Training activity on one Port does not affect the activity of the other three Ports.

The Port Configuration Logic 1030 may be responsible for determining how each of the links will train as the same link can be configured as a single 4x link, a single 1x link or four (4) independent 1x links. The Port Configuration Logic 1030 may also be responsible for determining the information that is returned for the PortInfo Attribute as defined by the InfiniBand™ Architecture specification to configure and control the operation of each Port.

In order to support a flexible port configuration option that supports a single 4x Port or a single 1x Port or four (4) independent 1x Ports, the Port Configuration Logic 1030 may perform the following port configurations:

(1) Provide a configuration option to select a single 4x Port or a single 1x Port or four (4) independent 1x Ports. This can be controlled be any of the following methods: (a) Dedicated pin that is tied to a logic "1" or a logic "0" to select the Port Mode; and (b) A configuration register that selects the Port Mode. The configuration register can be written in any of the following ways: (i) A Configuration PROM that sets the Port Mode after the Port is reset; (ii) An implementation dependent bus interface that allows a local microprocessor write the configuration register to select the Port Mode; and (iii) A Vendor Defined Attribute that allows InfiniBand Subnet Management Packets (SMP) set the Port Mode.

(2) Provide four (4) independent sets of PortInfo Attribute Register Blocks for ports N, N+1, N+2, and N+3.

When configured to support a single 4x Port or a single 1x Port, the PortInfo Attribute Register Blocks support the following:

(a) Register Block N is enabled for normal Get and Set access to support access with Subnet Management Packets (SMP). LinkWidthSupported field may be set to "3" to indicate the Port supports both 1x and 4x operation. Port Physical State may be set to Sleep or Polling to allow the Port to automatically configure with remote ports. The Port will support both 4x and 1x operation. All other PortInfo Attribute fields support normal InfiniBand operation for a 4x capable port.

(b) Register Blocks N+1, N+2, N+3 support Get access to read the PortInfo fields for these port but Set access is disabled. LinkWidthSupported field may be set to to indicate the Ports only support 1x operation. PortPhysicalState field may be set to Disabled (3) to indicate the Ports are disabled. All other PortInfo fields return a static configuration for InfiniBand 1x capable Ports.

When configured to support four (4) independent 1x Ports, the PortInfo Attribute Register Blocks support the following.

(a) Register Blocks N, N+1, N+2, and N+3 are all enabled for normal Get and Set access to support access with Subnet Management Packets (SMP). LinkWidthSupported field may be set to "1" to indicate the Ports only support 1x operation. PortPhysicalState field may be set to "Sleep" or "Polling" to allow the four (4) independent 1x Ports to automatically configure with remote ports. The Ports will only support 1x operation. All other PortInfo Attribute fields support normal InfiniBand operation for 1x capable Ports.

The SerDes (Serialize/Deserialize) 1040A–1040D may convert the bit serial 2.5 Gbps data stream into internal 10 bit buses clocked at 250 MHz, for example. Each SerDes may be used for each physical link.

The TX and RX buses 1050A–1050B may be used to connect the Link Physical Interface Logic 1020 to the Link Layer Interface Logic 1010. The frequency and width of the TX and RX buses 1050A–1050B are implementation dependent so as to support a 1 GB/s 4x Port or four (4) independent 1x Ports. For example, the frequency and width of the TX and RX buses 1050A–1050B may be 2 bytes wide at 500 MHz; 4 bytes wide at 250 MHz; or 8 bytes wide at 125 MHz.

In 4x mode operation, the TX and RX buses 1050A–1050B may hold data on each clock cycle when sending and receiving data packets In 1x mode operation, the TX and RX buses 1050A–1050B may hold data every forth clock cycle and are idle for three cycles.

When configured to support four (4) independent 1x Ports, the TX and RX buses 1050A–1050B are time multiplexed to provide four (4) time slots for the four (4) independent 1x Ports. In addition to the data buses 1050A–1050B used to transfer packets, the TX and RX buses 1050A–1050B may have sideband signals that indicate when the TX and RX buses 1050A–1050B are idle, transfer data, hold the start or end of a packet, or if a bad packet was received.

FIGS. 11A–11D are example timing diagrams of example transmitter/receiver (TX/RX) buses 1050A–1050B used by a single 4x Port according to an embodiment of the present invention. FIG. 11A illustrates an example clock cycle; FIG. 11B illustrates an example time slot; FIG. 11C illustrates an example data transmission on a TX bus 1050A or a RX bus 1050B during designated clock cycles shown in FIG. 11A; and FIG. 11D illustrates an example sideband signal used to indicate the start and the end of data packets on a TX bus 1050A or a RX bus 1050B. The example shown in FIGS. 11A–11D describes how a single 4x Port transfers a data packet for eight (8) cycles.

Specifically, the data packet starts on cycle #2 shown in FIG. 11A, the first word of the data packet is "D0", and the sideband signal "S" indicates that this is the start of a data packet.

On cycles #3 to #8 shown in FIG. 11A, data words "D" to "D6" are sent shown in FIG. 11C. The sideband signal "D" indicates that valid data is on the TX bus 1050A or the RX bus 1050B shown in FIG. 11D.

The data packet ends on cycle #9, the last word of the packet is "D7", and the sideband signal "E" indicates that this is the end of the data packet. The sideband signal indicates "I" when the TX bus 1050A or the RX bus 1050B is idle and no data is being transferred on the TX bus 1050A or the RX bus 1050B.

If a data packet is a bad packet, the sideband signal may be represented as "B" to indicate the end of packet that contains an error. However, this is not shown in the example of FIGS. 11A–11D. In addition, the "Time Slot" signal as shown in FIG. 11B is not used in this single 4x Port mode.

FIGS. 12A–12D are example timing diagrams of example transmitter/receiver (TX/RX) buses 1050A–1050B used by a single 1x Port according to an embodiment of the present invention. FIG. 12A illustrates an example clock cycle; FIG. 12B illustrates an example time slot; FIG. 12C illustrates an example data transmission on a TX bus 1050A or a RX bus 1050B during designated clock cycles shown in FIG. 12A; and FIG. 12D illustrates an example sideband signal used to indicate the start and the end of data packets on a TX bus 1050A or a RX bus 1050B. The example shown in FIGS. 12A–12D describes how a single 1x Port transfers the beginning a data packet.

Specifically, the data packet starts on cycle #4 shown in FIG. 12A, the first word of the data packet is "D0", and the sideband signal "S" indicates that this is the start of a data packet.

On cycles #8 and #12, data words "D1" and "D2" are sent on a TX bus 1050A or a RX bus 1050B as shown in FIG. 12C. The sideband signal "D" indicates that valid data is on the TX bus 1050A or the RX bus 1050B. The end of the data packet is not shown but the sideband signal may be represented as "E" to indicate the end of a data packet. The sideband signal is "I" when the TX bus 1050A or the RX bus 1050B is idle and no data is being transferred on the TX bus 1050A or the RX bus 1050B. Again, the "Time Slot" signal shown in FIG. 12B is not used in this single 1x Port mode.

FIGS. 13A–13D are example timing diagrams of example transmitter/receiver (TX/RX) buses used by four (4) independent 1x Ports according to an embodiment of the present invention. FIG. 13A illustrates an example clock cycle; FIG. 13B illustrates an example time slot; FIG. 13C illustrates an example data transmission on a TX bus 1050A or a RX bus 1050B during designated clock cycles shown in FIG. 13A; and FIG. 13D illustrates an example sideband signal used to indicate the start and the end of data packets on a TX bus 1050A or a RX bus 1050B. The example shown in FIGS. 13A–13D describes how four (4) independent 1x Ports transfer data packets. The "Time Slot" signal is used in this 4 1x Ports mode to select the Port using the TX bus 1050A or the RX bus 1050B. Port #0 uses Time Slot #0, Port #1 uses Time Slot #1, Port #2 uses Time Slot #2, and Port #3 uses Time Slot #3 as shown in FIG. 13B.

Port #0 is sending the end of a data packet. On cycles #0 and #4, Port #0 sends data words "D7" and "D8" and the sideband signal is "D". On cycle #8, Port #0 sends "D9" and the sideband and signal is "E" to indicate the end of the data packet. Cycle #12 is not used and the sideband signal is "1".

Port #1 starts sending a data packet on cycle #1, the TX bus 1050A or the RX bus 1050B holds "D0" and the sideband signal is set to "S" to indicate the start of the data packet.

On cycles #5, #9, and #13, Port #1 sends "D1", "D2" and "D3". The sideband signal is "D" to indicate valid data is on the TX bus 1050A or the RX bus 1050B.

Port #2 is in the middle of sending a data packet and sends "D5", "D6", "D7" and "D8" on cycles #2, #6, #10, and #14. The sideband signal is "D" to indicate valid data is on the TX bus 1050A or the RX bus 1050B.

Port #3 is in the middle of sending a data packet and sends "D3", "D4", and "D5" on cycles #3, #7, and #11. The sideband signal is "D" to indicate valid data is on the TX bus 1050A or the RX bus 1050B.

Returning back to FIG. 10, the Shared VCRC Generation/Checking Logic 1012 may be used on the TX bus 1050A to generate the VCRC (Variant Cyclic Redundancy Code) for link packets and data packets as described with reference to FIG. 3. The VCRC may be generated for one data packet at a time when the Port is configured as a single 4x Port or a single 1x Port. When the Port is configured as four (4) independent 1x Ports, however, the VCRC may be generated for four (4) data packets at a time, and all four (4) data packets may be time-multiplexed on the TX Bus 1050A, for example.

The Shared VCRC Generation/Checking Logic 1012 may also be used on the RX bus 1050B to check the VCRC for link packets and data packets as described with reference to FIG. 3. The VCRC may be checked for one packet at a time when the Port is configured as a single 4x Port or a single 1x Port. When the Port is configured as four (4) independent 1x Ports, however, the VCRC may be checked for four (4) data packets at a time, and all four (4) data packets may be time-multiplexed on the RX Bus 1050B.

According to the InfiniBand™ Architecture specification, the VCRC must be appended to the end of the data packet when sending data packets, via the physical links, as described with reference to FIG. 3. Likewise, the VCRC must be checked at the end of the data packet when receiving data packets from the physical links.

Every data packet transferred must have the VCRC calculated. The polynomial used is 0x100B. The procedure for the calculation may be described as follows:

1. The initial value of the CRC is 0xFFFF.
2. The CRC calculation is done in big Endian order with the least significant bit (LSB) of the first byte of the Local Route Header (LRH) being the first bit in the CRC calculation.
3. The bit sequence from the calculation is complemented and the result is the VCRC.

This calculation can be used to verify the received VCRC included in a received data packet or to generate an outgoing VCRC to be included in a transmit data packet. As the internal datapath increases to support the required datapath, the ability to generate the VCRC becomes timing critical and gate intensive.

Therefore, the Shared VCRC Generation/Checking Logic 1012 must be implemented to calculate the VCRC for data packets when the Port logic is configured as a single 4x Port, a single 1x Port or four (4) independent 1x Ports. The Shared VCRC Generation/Checking Logic 1012 may re-use the internal parallel equations used to generate the CRC each time there is valid data packet presented.

For example, when running in 4x mode, data may be presented to the Shared VCRC Generation/Checking Logic 1012 every clock for the same data packet. When running in 1x mode, data may be presented to the Shared VCRC Generation/Checking Logic 1012 every fourth clock for the same data packet. When running in four (4) independent 1x mode, data may be presented to the Shared VCRC Generation/Checking Logic 1012 every clock but is time-sliced amongst four (4) data packets being sent staggered every clock. Below is a timing sequence showing the data packet as the data packet arrives.

| Clock # | Port # |
|---------|--------|
| 1 | port0, data0 |
| 2 | port1, data0 |
| 3 | port2, data0 |
| 4 | port3, data0 |
| 5 | port0, data1 |
| 6 | port1, data1 |
| 7 | port2, data1 |
| 8 | port3, data1 |

Data must be staggered to take advantage of re-using the internal logic blocks that generate the VCRC. The Shared VCRC Generation/Checking Logic implementation may generate a VCRC for either an 8-byte or 4-byte internal datapath, but not limited thereto.

Figure 14:
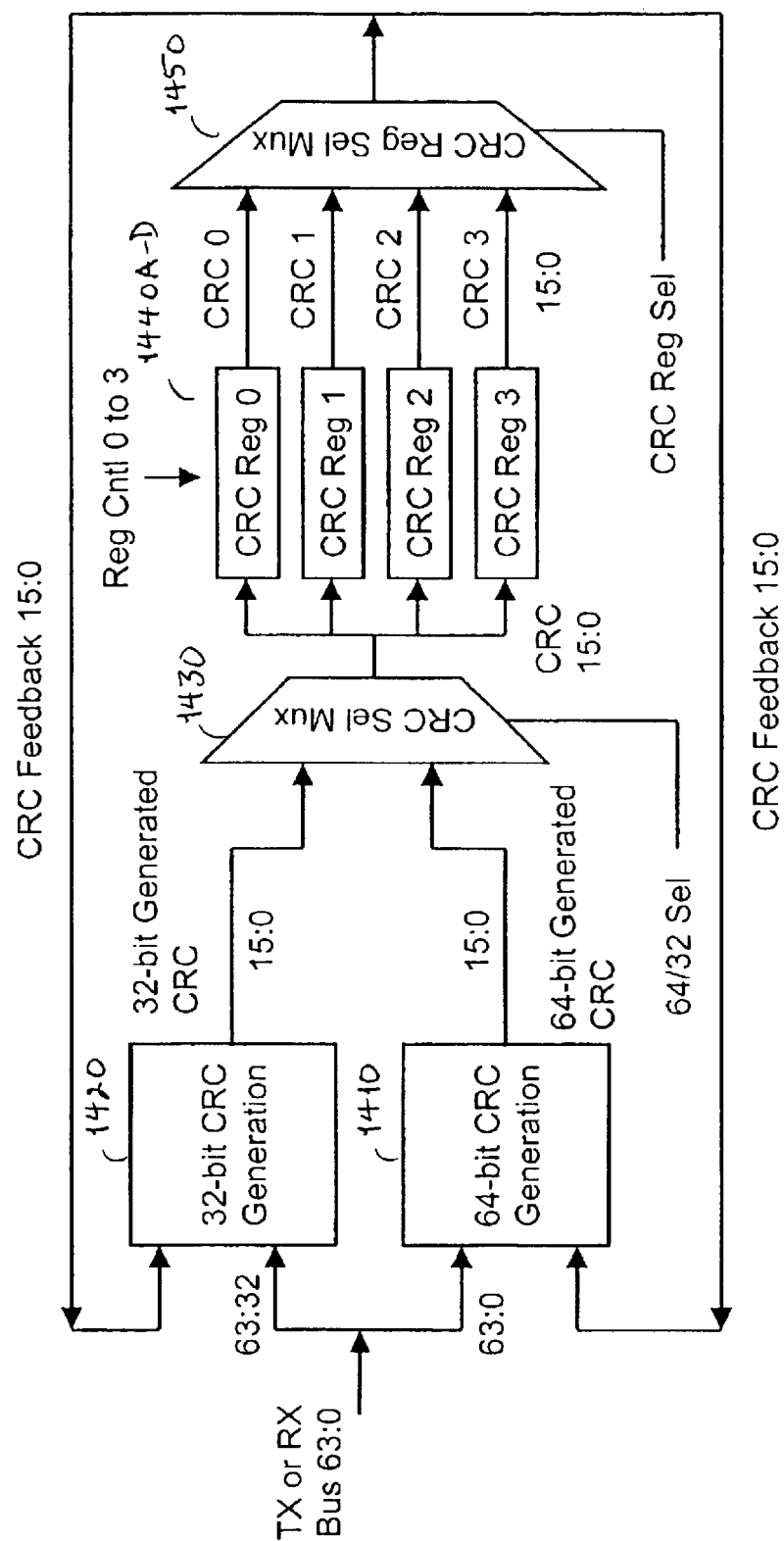
FIG. 14 illustrates an example Shared VCRC Generation/Checking Logic according to an embodiment of the present invention.

FIG. 14 illustrates an example Shared VCRC Generation/Checking Logic 1012 according to an embodiment of the present invention. The Shared VCRC Generation/Checking Logic 1012 can be implemented 2, 4, or 8 bytes at a time to match the width of the TX bus 1050A and the RX Bus 1050B. However, the example shown herein indicates a 8 byte implementation.

As shown in FIG. 14, the Shared VCRC Generation/Checking Logic 1012 may include a 64 bit CRC Generation Block 1410, a 32 bit CRC Generation Block 1420, a CRC Sel Mux 1430, a CRC Reg #0 to CRC Reg #3 1440A–1440D, and a CRC Reg Sel Mux 1450.

The 64 bit CRC Generation Block 1420 may be used to compute VCRC for most of the data packet when the data is transferred 8 bytes at a time.

The 32 bit CRC Generation Block 1420 may be used to compute the VCRC for the last 4 bytes of the data packet if the data packet has an odd number of 4 byte words, and to compute the Link CRC for link packets.

Both the 64 bit CRC Generation Block 1410 and the 32 bit CRC Generation Block 1420 provide exclusive or logic derived from the CRC-16 polynomial to compute the 16 CRC bits in parallel using 64/32 bits from the RX or TX bus and the 16 bits of CRC state on the CRC Feedback bus. Computes the next 16 bits of the VCRC.

The CRC Sel Mux 1430 may select if the 64 bit or 32 bit Generated CRC is used in accordance with a 64/32 Selection signal. The CRC Sel Mus 1430 may default to 64 bit CRC and select 32 bit CRC for link packets or the last 4 bytes of a data packet as described with reference to FIG. 3.

The CRC Reg #0 to CRC Reg #3 1440A–1440D may hold the CRC State for Port 0 to Port 3. Only CRC Reg #0 1440A is used if the Port is configured to support a single 4x Port or a single 1x Port. The CRC Reg #0 to CRC Reg #3 1440A–1440D are used if the Port is configured to support four (4) independent 1x Ports. Reg Cntl #0 to #3 are used to control initializing and updating CRC Reg #0 to #3 1440A–1440D. Time Slot controls which CRC Reg (#0 to #3) is selected if the Port is configured to support four (4) independent 1x Ports.

The CRC Reg Sel Mux 1450 may select any one of CRC #0 to CRC #3 from the CRC Reg #0 to CRC Reg #3 1440A–1440D for CRC feedback, via the CRC Feedback Bus in accordance with a CRC Reg Sel signal. For example, the CRC Reg Sel Mux 1450 may only select CRC #0 from the CRC Reg #0 1440A, for example, if the Port is configured to support a single 4x Port or a single 1x Port. Time Slot controls which CRC Reg (#0 to #3) is selected if the Port is configured to support four (4) independent 1x Ports.

The Shared VCRC Generation/Checking Logic implementation shown in FIG. 14 eliminates the need of multiple VCRC logic blocks to generate the VCRC for data packets for multiple Ports. In addition, the Shared VCRC Generation/Checking Logic can be easily modified to support any number of Ports or data widths to achieve substantial savings in logic gates when generating the VCRC.

As described from the foregoing, the present invention advantageously provides configuration mechanisms that enable dynamic port allocation and shared resource utilization for Variant Cyclic Redundancy Code (VCRC) to support multiple port configurations on a particular host. As a result of the mechanism and procedure as described with reference to FIGS. 9–10 and 14, each 4x Port can be configured to support multiple port width configurations such as a single 4x Port, a single 1x Port or four (4) independent 1x Ports. A user (customer) may configure the Port as a 4x Port in order to move substantial amount of data, or alternatively, four (4) independent 1x Ports in order to enable more connectivity over bandwidth. In addition, only a single Shared VCRC Generation/Checking Logic block is needed for all ports in the channel adapter (CA) or a switch to generate the VCRC for data packets in lieu of multiple VCRC generation blocks required in existing InfiniBand™ Architecture specification, thereby resulting in the substantial savings in logic gates. These properties assist in achieving the end result of a functional and high performance cluster and promote the use of clusters based on NGIO/InfiniBand™ technology.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the data network as shown in FIGS. 1–4 may be configured differently or employ some or different components than those illustrated. Such a data network may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. However, the port configuration mechanisms shown in FIGS. 10 and 14 for multiple port allocation and shared resource utilization to support multiple port configurations for different port operation modes on a host may need to be adjusted accordingly. In addition, the port configuration mechanisms shown can be implemented either in hardware or software module (i.e., an application program) installed in the host node (end node or switch) in the IBA subnet. For example, if port configuration mechanisms shown in FIGS. 10 and 14 are implemented in software, software module may be written using high-level programming languages such as C, C++ and Visual Basic, and may be provided on a computer tangible medium, such as memory devices such as EPROM, EEPROM, and flash devices; magnetic disks (fixed, floppy, and removable); other magnetic media such as magnetic tapes; optical media such as CD-ROM disks, or via Internet downloads. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A method of port configuration in a host comprising: determining if a designated port supports a multi-link mode operation for data transfers, via one or more links;

if the designated port supports the multi-link mode operation, configuring and training the designated port to serve as one of a single link capable port which transfer data via a single link, a multiple link capable port which transfers data via respective multiple links, and multiple of single link ports which transfer data via a respective single link; and generating and checking a Variant Cyclic Redundancy Code (VCRC) at the end of each data packet by computing the VCRC for most of the data packet when data is transferred with a first set of bytes, computing the VCRC for a second set of bytes that is smaller than the first set of bytes of the data packet if the data packet has some smaller subset of bytes than the first set of bytes, and computing a link CRC for link packets, selecting a CRC in accordance with a first selection signal, holding a CRC state for port designations in a plurality of CRC registers, and selecting an outout from any one of the CRC registers for CRC feedback in accordance with a second selection signal.

2. The method as claimed in claim 1, wherein the multi-link mode operation corresponds to a 4x mode operation where 4x indicates four (4) physical links between respective ports.

3. The method as claimed in claim 2, wherein the single link capable port corresponds to a 1x capable port which transfer data via a single 1x link, the multiple link capable port corresponds to a 4x capable port which transfers data via respective 4x links, and the multiple of single link ports correspond to four (4) independent 1x ports which transfer data via a respective single 1x link.

4. The method as claimed in claim 3, wherein each link is trained independently to enable the designated port to serve as the 1x capable port, the 4x capable port, or the four (4) independent 1x ports.

5. The method as claimed in claim 4, wherein the designated port is configured for the multi-link mode operation using a PortInfo Attribute in accordance with the "InfiniBand™ Architecture Specification".

6. The method as claimed in claim 1, wherein the VCRC is generated for one packet at a time when the designated port is configured as the 1x capable port or the 4x capable port, or alternatively, for four (4) packets at a time when the designated port is configured as four (4) independent 1x ports.

7. A host node comprising:

at least one port to support data transfers, via one or more links; and a port configuration mechanism to configure and train the port to serve as a 1x capable port which transfer data via a 1x link, a 4x capable port which transfers data via respective 4x links, or four (4) independent 1x ports which transfer data via a respective 1x link;

wherein the port configuration mechanism further includes Shared Variant Cyclic Redundancy Code (VCRC) Generation/Checking Logic to generate and to check the VCRC for every data packet, and wherein the Shared VCRC Generation/Checking Logic includes:

a 64 bit CRC Generation Block arranged to compute the VCRC for most of the data packet when data is transferred 8 bytes at a time;

a 32 bit CRC Generation Block arranged to compute the VCRC for the last 4 bytes of the data packet if the data packet has an odd number of 4 byte words, and to compute the Link CRC for link packets;

a first multiplexer arranged to select if a 64 bit or a 32 bit Generated CRC is used in accordance with a first selection signal;

a plurality of CRC Registers arranged to hold the CRC State for Port designations; and a second multiplexer arranged to select an output from any one of the CRC Registers for CRC feedback, via a CRC feedback bus in accordance with a second selection signal.

8. The host node as claimed in claim 7, wherein the port is configured for a multi-link mode operation using a PortInfo Attribute in accordance with the "InfiniBand™ Architecture Specification".

9. The host node as claimed in claim 7, wherein the VCRC is generated for one data packet at a time when the port is configured as one 1x capable port or as one 4x capable port.

10. The host node as claimed in claim 9, wherein the VCRC is generated for four (4) data packets at a time when the port is configured as four (4) independent 1x capable ports.

11. The host node as claimed in claim 7, wherein the port configuration mechanism further comprises four independent Link Training Logic Blocks arranged to train each link independently to enable the port to serve as the 1x capable port, the 4x capable port, or the four (4) independent 1x ports.

12. The host node as claimed in claim 11, wherein, when the port is configured as one 1x capable port or one 4x capable port, only one Link Training Logic Block is enabled and the remainder Logic Blocks are disabled.

13. The host node as claimed in claim 11, wherein, when the port is configured as four (4) independent 1x capable ports, all four Link Training Logic Blocks are enabled and each 1x capable port operates independently from each other.

14. A computer readable medium comprising instructions that, when executed by a host node in a switched fabric including end nodes and switches interconnected via one or more links, cause the host node to support multiple port configurations on the host node by:
determining if a designated port in the host node supports a multi-link mode operation for data transfers, via one or more links;
if the designated port supports the multi-link mode operation, configuring and training the designated port to serve as one of a single link capable port which transfer data via a single link, a multiple link capable port which transfers data via respective multiple links, and multiple of single link ports which transfer data via a respective single link; and
generating and checking a Variant Cyclic Redundancy Code (VCRC) at the end of each data packet by computing the VCRC for most of the data packet when data is transferred with a first set of bytes, computing the VCRC for a second set of bytes that is smaller than the first set of bytes of the data packet if the data packet has a smaller subset of bytes than the first set of bytes, and computing a link CRC for link packets, selecting a CRC in accordance with a first selection signal, holding a CRC state for port designations in a plurality of CRC registers, and selecting an output from any one of the CRC registers for CRC feedback in accordance with a second selection signal.

15. The computer readable medium as claimed in claim 14, wherein the single link capable port corresponds to a 1x capable port which transfer data via a single 1x link, the multiple link capable port corresponds to a 4x capable port which transfers data via respective 4x links, and the multiple of single link ports correspond to four (4) independent 1x ports which transfer data via a respective single 1x link.

16. The computer readable medium as claimed in claim 14, wherein each link is trained independently to enable the designated port to serve as the 1x capable port, the 4x capable port, or the four (4) independent 1x ports.

17. The computer readable medium as claimed in claim 14, wherein the designated port is configured for the multi-link mode operation using a PortInfo Attribute in accordance with the "InfiniBand™ Architecture Specification".

18. A host node comprising:
at least one port to support a multi-link mode operation for data transfers, via one or more links; and
a port configuration mechanism to configure and train the at least one port to serve as one of a single link capable port which transfer data via a single link, a multiple link capable port which transfers data via respective multiple links, and multiple single link ports which transfer data via a respective single link;
wherein the port configuration mechanism further includes Shared Variant Cyclic Redundancy Code (VCRC) Generation/Checking Logic to generate and to check the VCRC for every data packet, and wherein the Shared VCRC Generation/Checking Logic includes:
a first CRC generator arranged to compute a first VCRC for most of the data packet when data is transferred in a first size;
a second CRC generator arranged to compute a second VCRC for a portion of the data packet if the data packet has a second size, and to compute the Link CRC for link packets;
a first multiplexer arranged to select if the first or the second computed VCRC is used in accordance with a first selection signal;
a plurality of CRC registers arranged to hold a CRC State for port designations; and
a second multiplexer arranged to select an output from any one of the CRC registers for CRC feedback in accordance with a second selection signal.

19. The host node as claimed in claim 18, wherein the port is configured for a multi-link mode operation using a PortInfo Attribute in accordance with the "InfiniBand™ Architecture Specification".

20. The host node as claimed in claim 18, wherein the VCRC is generated for one data packet at a time when the port is configured as one 1x capable port or as one 4x capable port.

21. The host node as claimed in claim 20, wherein the VCRC is generated for four (4) data packets at a time when the port is configured as four (4) independent 1x capable ports.

22. The host node as claimed in claim 18, wherein the port configuration mechanism further comprises four independent Link Training Logic Blocks arranged to train each link independently to enable the port to serve as the 1x capable port, the 4x capable port, or the four (4) independent 1x ports.

23. The host node as claimed in claim 22, wherein, when the port is configured as one 1x capable port or one 4x capable port, only one Link Training Logic Block is enabled and the remainder Logic Blocks are disabled.

24. The host node as claimed in claim 22, wherein, when the port is configured as four (4) independent 1x capable ports, all four Link Training Logic Blocks are enabled and each 1x capable port operates independently from each other.

* * * * *